1

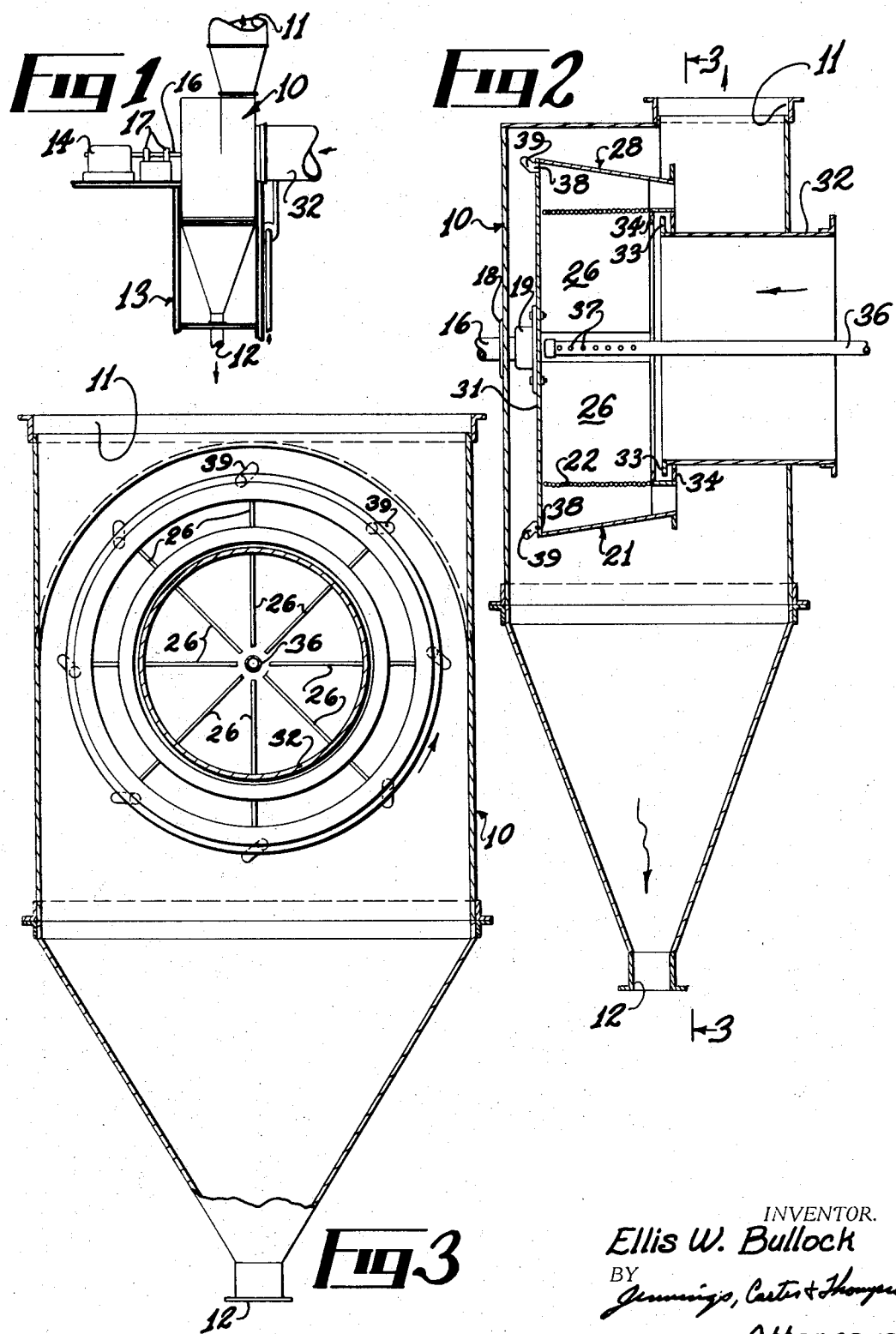

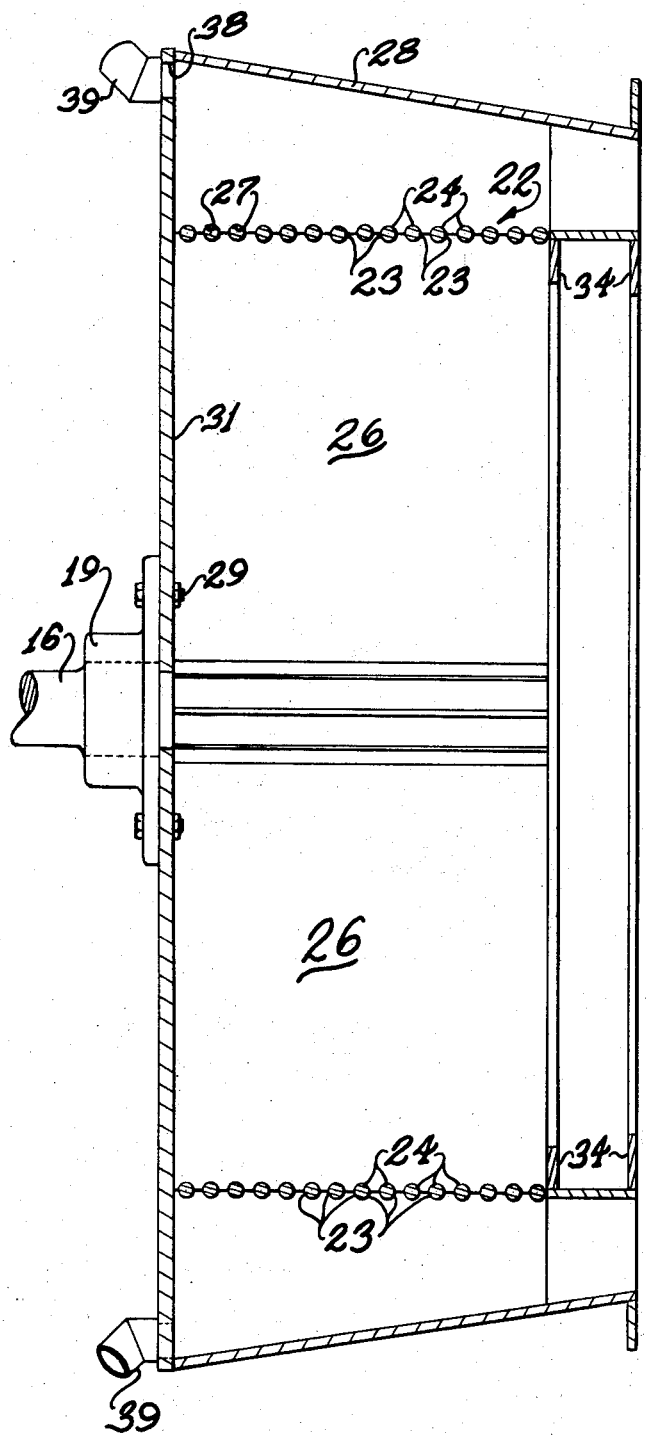

3,371,470
APPARATUS FOR SEPARATING ENTRAINED
MATERIALS FROM GASES
Ellis W. Bullock, Birmingham, Ala., assignor to The Fly
Ash Arrestor Corporation, a corporation of Alabama
Filed Jan. 25, 1966, Ser. No. 522,893
1 Claim. (Cl. 55—231)

ABSTRACT OF THE DISCLOSURE

Separator appartus having a cylindrical member mounted within and spaced from an imperforate, frusto-conical casing. A closure member closes the larger diameter end of the casing and the adjacent end of the cylindrical member leaving the opposite end of the casing open for gas discharge. The cylindrical member rotates with the casing and has venturi-like orifices therethrough. Vanes divide the casing and cylindrical member into a plurality of angularly spaced compartments and openings adjacent the larger diameter end of the casing discharge materials separated from gas.

This invention relates to apparatus for separating entrained materials from gases and more particularly to an improved liquid scrubber for scrubbing gases containing solids, semi-solids, and the like.

An object of my invention is to provide apparatus for separating entrained materials from gases of the character designated in which the scrubbing action is very thorough whereby the gases are left in an extremely solids-free condition.

A further object of my invention is to provide apparatus of the character designated in which a plurality of venturi-like orifices are provided in a generally cylindrical centrifuge.

A still further object of my invention is to provide apparatus for separating entrained materials from gases of the character designated which shall be simple of construction, economical of manufacture and one which is efficient in operation.

Briefly, my improved apparatus for separating entrained materials comprises a generally cylindrical member mounted for rotation within an outer housing. A multiplicity of venturi-like orifices are provided through the cylindrical member and a frusto-conical casing surrounds the cylindrical member to define an annular space therebetween. One end of the cylindrical member and the adjacent end of the frusto-conical casing is closed whereby upon rotation of the cylindrical member and the conical casing at a high peripheral velocity, the scrubbing liquid, gas and the materials entrained therein are moved by centrifugal force outwardly through the venturi-like orifices. The gases free of solids are discharged through the open end of the casing while the solid materials and liquid are discharged adjacent the periphery of the frusto-conical casing.

Apparatus embodying features of my invention is illustrated in the accompanying drawings, forming a part of this application, in which:

FIG. 1 is a side elevational view of the apparatus, partly broken away;

FIG. 2 is an enlarged, vertical sectional view of the apparatus shown in FIG. 1;

FIG. 3 is a sectional view taken generally along the line 3—3 of FIG. 2; and

FIG. 4 is an enlarged, fragmental view showing the centrifuge removed from the housing.

Referring now to the drawings for a better understanding of my invention, I show an outer housing 10 having a gas outlet 11 adjacent the upper end thereof and an outlet 12 adjacent the lower end thereof for discharging solids and liquids separated from the gas. The housing 10 is supported by a suitable frame 13 as shown in FIG. 1.

Mounted on the supporting frame 13 adjacent the housing 10 is a power unit, such as an electric motor 14, which drives a shaft 16 which in turn passes through the housing 10, as shown in FIG. 2. The shaft 16 is supported for rotation in suitable bearings 17, as shown. Also, a suitable seal 18 is interposed between the shaft 16 and the housing 10.

Secured to the shaft 16 inwardly of the housing 10 is a hub 19 of a centrifuge indicated generally at 21. The centrifuge 21 comprises a cylindrical member 22 having a multiplicity of venturi-like orifices 23 therethrough, as shown in FIG. 4. Preferably, the venturi-like orifices 23 are defined by a plurality of annular, rod-like members 24 which are spaced from each other to define the venturi-like openings. The rod-like members 24 are secured rigidly in place by a plurality of radially extending vanes 26, which have suitable openings 27 therethrough for receiving the rod-like members 24, as shown in FIG. 4. Also, the vanes 26 extend beyond the cylindrical member defined by the rod-like members 24 and are secured to the inner surface of a frusto-conical casing 28 which flares outwardly toward the hub 19.

Secured rigidly to the hub 19 by suitable bolts 29 is a rotor plate or end wall 31 which is secured at its outer edge to the outwardly flaring end of the frusto-conical casing 28 by suitable means, such as by welding. Also, the vanes 26 are welded to the inner surface of the end wall 31 to provide a sturdy and rigid structure. The radially extending vanes 26 separate the cylindrical member 22 and the frusto-conical casing 28 into a plurality of angularly spaced compartments and pull the gas and materials entrained therein into the cylindrical member 22 and assist in forcing the same outwardly through the venturi-like orifices 23.

Extending through and secured to the housing 10, as shown in FIG. 2 is an inlet conduit 32 for introducing gas and materials entrained therein into the cylindrical member 22. The inner end of the conduit 32 is provided with an annular, out-turned flange 33 which is adapted to extend between inwardly extending, annular flanges 34 carried by the vanes 26. The angular flanges 33 and 34 thus cooperate with each other to provide a liquid seal which prevents the escape of liquid and gas outwardly of the cylindrical member 22, thus assuring that all of the liquid, gas and entrained materials flow through the venturi-like orifices 23 into the annular chamber defined between the frusto-conical casing 28 and the cylindrical member 22.

Extending through the inlet conduit 32 and inwardly of the centrifuge is a conduit 36 for supplying scrubbing liquid, such as water, into the compartments defined between the radially extending vanes 26. As shown in FIGS. 2 and 3, the inner end of the conduit 36 is concentric with the cylindrical member 22 and the frusto-conical casing 28 whereby it extends along the axis of rotation of the centrifuge. The inner end of the conduit 36 is perforated as at 37 whereby liquid is introduced between the vanes 26.

Angularly spaced discharge passageways 38 are provided adjacent the periphery of the inner wall 31 in position to discharge liquid and the materials carried thereby outwardly of each of the compartments defined between the vanes 26. As shown in FIG. 3, the discharge passageways 38 communicate with discharge conduits 39 which extend rearwardly relative to the direction of rotation of the cylindrical member 22 and frusto-conical casing 28 to utilize the escapement reaction of the scrubbing liquid and thus reduce the driving power required to rotate the centrifuge.

From the foregoing description, the operation of my improved apparatus for separating entrained materials from gases will be readily understood. The cylindrical member 22 and the frusto-conical casing 28 are rotated at a high peripheral velocity by the motor 14. The gas bearing the materials to be separated therefrom is introduced through the conduit 32 into the cylindrical member 22 and the scrubbing liquid is introduced through the conduit 36 and the perforations 37 whereby it is directed outwardly between the vanes 26. The radial vanes 26 serve as a fan unit to create a partial vacuum whereby the air and materials entrained therein are drawn inwardly through the conduit 32. The vanes 26 also assist in forcing the scrubbing liquid, air and materials entrained therein through the venturi-like orifices 23 whereby the scrubbing action is very thorough and the gases are left in an extremely solids-free condition.

In a view of the fact that the frusto-conical casing 28 flares outwardly toward the end wall 31, liquid and solid materials being heavier than gas are separated from the gas and directed by centrifugal force toward the outermost or flared end of the frusto-conical casing 28. As the gases, solids and liquids impinge against the inner wall of the frusto-conical casing 28 clean, solids-free gas escapes through the open end of the frusto-conical casing 28 whereupon the gas is then discharged through the outlet 11. Centrifugal force separates all liquid from the gases and prevents foaming of the materials conveyed into the frusto-conical casing 28. The scrubbing liquid and the entrained solids therein flow toward the flared end of the frusto-conical casing 28 whereupon it is centrifically forced through the discharge passageways 38 into the conduits 39. The liquid and solids entrained therein then pass downwardly through the housing 10 whereupon they are discharged through the outlet 12.

From the foregoing, it will be seen that I have devised improved apparatus for separating entrained materials from gases. By introducing the scrubbing liquid and gases, together with the materials entrained therein inwardly of a cylindrical member having venturi-like orifices therein, together with radially extending vanes for directing the scrubbing liquid, gases and entrained materials outwardly through the venturi-like orifices the apparatus is efficient in operation. The scrubbing liquid, gases and entrained materials are subjected to a thorough scrubbing action which leaves the gases separated from the scrubbing liquid and entrained materials in an extremely cleaned condition. Furthermore, by providing a frusto-conical or flared casing 28, centrifugal force breaks up any resulting foam and causes the scrubbing liquid and the entrained solids carried thereby to flow freely to the point of greatest diameter of the frusto-conical casing 28 whereupon the liquid and solid materials are discharged through the openings 38.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

1. In apparatus for separating materials from gases:
   (a) a housing having an opening in the upper portion thereof for discharging gases and an opening in the lower portion thereof for discharging materials separated from the gas,
   (b) a shaft extending through said housing and mounted in bearings for rotation about a horizontal axis,
   (c) a seal between said shaft and said housing,
   (d) a generally cylindrical member operatively connected to said shaft and supported for rotation therewith about a horizontal axis within said housing,
   (e) said cylindrical member having a plurality of annular, rod-like members spaced laterally from each other to define a multiplicity of venturi-like orifices therethrough,
   (f) an imperforate, frusto-conical casing having a larger diameter end and a smaller diameter end surrounding and concentric with said cylinder member and defining an annular space therebetween,
   (g) a closure member secured to said shaft and said frusto-conical casing closing said larger diameter end of said frusto-conical casing and the adjacent end of said cylindrical member,
   (h) radially extending vanes mounted for rotation with and dividing said cylindrical member and said frusto-conical casing into a plurality of angularly spaced compartments,
   (i) means to rotate said shaft to impart rotation to said cylindrical member and said frusto-conical casing at a high peripheral velocity,
   (j) a gas inlet conduit communicating with said cylindrical member to introduce gas and materials entrained therein into the end of said cylindrical member opposite the closed end thereof so that the gases and materials entrained therein move outwardly through said venturi-like orifices into said annular space and are separated from each other,
   (k) inwardly extending cooperating flanges carried by said inlet conduit and said cylindrical member defining a rotary seal therebetween,
   (l) a liquid supply conduit extending within said housing adjacent the axis of rotation of said cylindrical member and having a plurality of discharge openings therein to mix liquid with the gases and materials entrained therein,
   (m) there being an annular discharge passageway between said smaller diameter end of said frusto-conical casing and the adjacent end of said cylindrical member for discharging gases to said opening in the upper portion of said housing, and
   (n) discharge passageways adjacent the juncture of said closure member and said larger diameter end of said frusto-conical casing extending rearwardly relative to the direction of rotation of said frusto-conical casing for discharging said materials separated from the gas to said opening in the lower portion of said housing.

References Cited

UNITED STATES PATENTS

| | | |
|---|---|---|
| 881,723 | 3/1908 | Scheibe. |
| 888,091 | 5/1908 | Kestner. |
| 1,480,775 | 1/1924 | Marien _____ 55—230 |
| 1,717,412 | 6/1929 | Rowe _____ 55—231 X |
| 1,868,808 | 7/1932 | Robbins _____ 261—83 |
| 2,178,481 | 10/1939 | Lindroth. |
| 2,913,232 | 11/1959 | Silverman. |
| 2,932,360 | 4/1960 | Hungate _____ 55—407 X |

FOREIGN PATENTS

| | | |
|---|---|---|
| 126,226 | 1/1932 | Austria. |
| 16,071 | 8/1912 | France. |
| 597,992 | 9/1925 | France. |
| 1,289,863 | 2/1962 | France. |
| 483,707 | 10/1929 | Germany. |
| 916,689 | 8/1954 | Germany. |
| 9,618 | 1914 | Great Britain. |
| 114,812 | 9/1945 | Sweden. |

FRANK W. LUTTER, *Primary Examiner.*

HARRY B. THORNTON, *Examiner.*

D. TALBERT, *Assistant Examiner.*